United States Patent [19]
Liu et al.

[11] Patent Number: 6,043,310
[45] Date of Patent: *Mar. 28, 2000

[54] THIN-WALL HOUSING

[75] Inventors: Chang Feng Liu, Oyama; Hideyuki Itoi, Utsunomiya, both of Japan

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/660,773

[22] Filed: Jun. 10, 1996

Related U.S. Application Data

[63] Continuation of application No. 08/443,971, May 18, 1995, abandoned.

[30] Foreign Application Priority Data

May 31, 1994 [JP] Japan .................................. 6-142627

[51] Int. Cl.⁷ ...................................... C08J 3/02
[52] U.S. Cl. .................... 524/502; 524/508; 524/537; 525/146; 252/299.01
[58] Field of Search ..................... 524/502, 508, 524/537; 252/299.01; 525/146

[56] References Cited

U.S. PATENT DOCUMENTS

| | | | |
|---|---|---|---|
| 4,460,735 | 7/1984 | Froix | 524/537 |
| 4,481,338 | 11/1984 | Serini et al. | 525/394 |
| 4,692,488 | 9/1987 | Kress et al. | 524/139 |
| 4,945,130 | 7/1990 | Genz et al. | 525/67 |
| 5,011,884 | 4/1991 | Rosenau et al. | 524/537 |
| 5,055,523 | 10/1991 | Inoue et al. | 525/148 |
| 5,061,745 | 10/1991 | Wittmann et al. | 524/139 |
| 5,262,473 | 11/1993 | Cottis et al. | 524/537 |
| 5,438,096 | 8/1995 | Wang et al. | 524/832 |

FOREIGN PATENT DOCUMENTS

| | | |
|---|---|---|
| 0 265 791 | 5/1988 | European Pat. Off. . |
| 0 389 055 | 9/1990 | European Pat. Off. . |
| 0 434 998 | 7/1991 | European Pat. Off. . |
| 0 605 157 | 7/1994 | European Pat. Off. . |
| 0 297 353 | 1/1989 | Germany . |
| 40 40 243 A1 | 12/1990 | Germany . |

OTHER PUBLICATIONS

WO–A–93 18090 (The Dow Chemical Comp) Sep. 16, 1993.

Chemical Abstracts, vol. 118, No. 10, Mar. 1993 Abstracts No. 82164, Abstract JP–A–04–225 054 Aug. 14, 1992.

*Primary Examiner*—Peter D. Mulcahy

[57] ABSTRACT

A fire-resistant polycarbonate resin composition containing A) 5–50 parts by weight of liquid crystal polymer, B) 90–40 parts by weight of polycarbonate resin, C) 2–20 parts by weight of flame retardant, and 0.1–1.0 parts by weight of polytetrafluoroethylene.

20 Claims, No Drawings

THIN-WALL HOUSING

This is a continuation of application Ser. No. 08/443,971 filed on May 18, 1995, now abandoned.

The objective of the present invention is to produce a fire-resistant polycarbonate resin composition suitable for thin-wall application having high flow properties, high elastic modulus, high HDT, and superior surface appearance as well as a high flame retardance achieved by blending a specific flame retardant.

The present invention pertains to a fire-resistant polycarbonate resin composition containing a polycarbonate and a liquid crystal polymer, and it further pertains to a fire-resistant polycarbonate resin composition having good flow properties, high impact resistance, and a high elastic modulus in comparison to standard polycarbonate resin compositions, and is suitable for thin-film housing applications.

The above-mentioned composition includes a specific polycarbonate having a phenolic end group, and the solubility with the liquid crystal polymer can be improved by the phenolic end group; as a result, the above-mentioned fire-resistant polycarbonate resin composition with superior properties can be produced.

Aromatic polycarbonate resins have high heat resistance, impact resistance, and mechanical strength and are widely used as high-performance resins, referred to as "engineering plastics." However, the process temperatures required for polycarbonates is high and the flow properties are poor. For this reason, blending with a liquid crystal polymer capable of providing good flow properties and a high elastic modulus is practiced.

Blending of an aromatic polycarbonate (PC) with a liquid crystal polymer is disclosed in the patent literature (Japanese Patent Application No. Hei 4[1992]-359735), (Japanese Patent Application No. Hei 6[1994]-74017), etc., which are applications by the present applicant.

In the contents disclosed in the above-mentioned existing technology, it is possible to produce a good balance among flow properties, high elastic modulus and high HDT, and products suitable for thin-wall housing applications such as notebook personal computers, pen recording computers, and handiphones are produced.

However, there is room for improvement in the blending of polycarbonate and liquid crystal polymers for thin-wall housings and cases for small portable machines.

The objective of the present invention is to produce a fire-resistant polycarbonate resin composition suitable for thin-wall applications which has good flow properties, high elastic modulus, high HDT, and superior surface appearance, as well as high flame retardance, which is achieved by blending a specific flame retardant.

The objective of the present invention can be achieved by a fire-resistant polycarbonate resin composition containing A) 5–50 parts by weight of liquid crystal polymer, B) 90–40 parts by weight of polycarbonate resin C) 2–20 parts by weight of flame retardant, and D) 0.1–1.0 part by weight of polytetrafluoroethylene.

For the liquid crystal polymer component (A) in the present invention, thermotropic liquid crystal polyesters can be used effectively, and 5–50 parts by weight, which is effective to improve the properties of the composition, are blended. Said material can be selected from the group of polyesters containing segments with the structure shown below.

—O—R—O—

—CO—R—CO—

—O—R—CO—

In this case, R can each be selected from the group shown below (Structure 1).

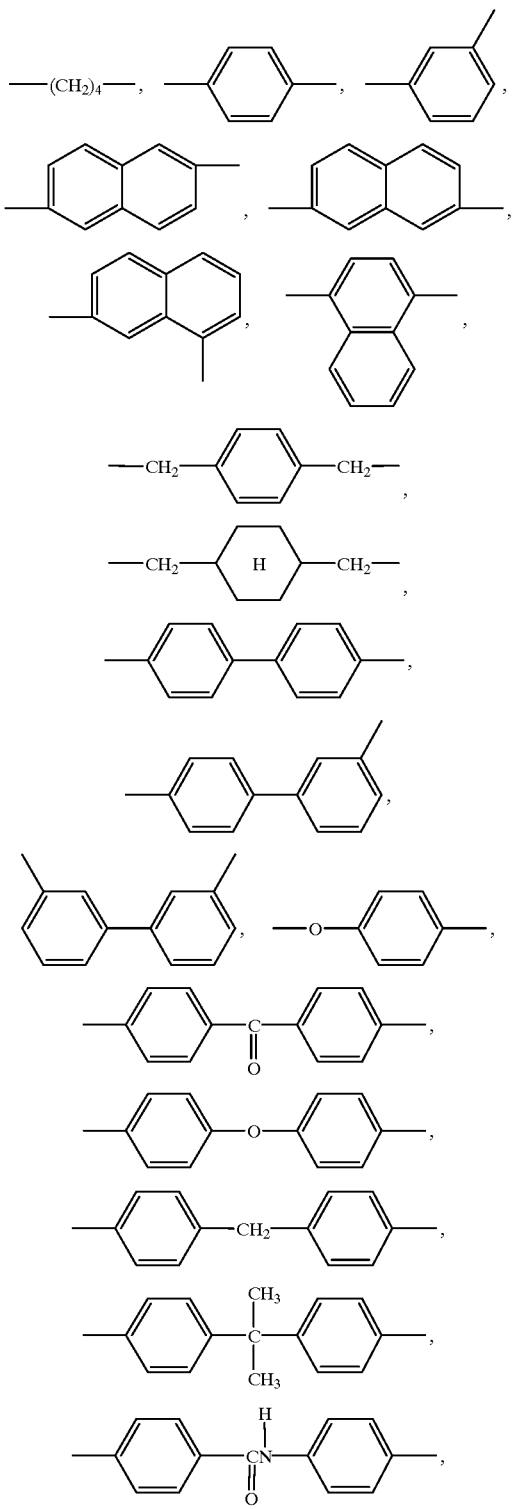

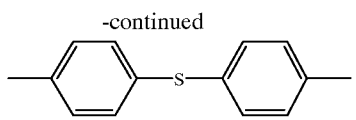

Furthermore, the aromatic rings, aliphatic groups, alicyclic group, etc., represented by the above-mentioned R may be further substituted with the groups shown below (Structure 2).

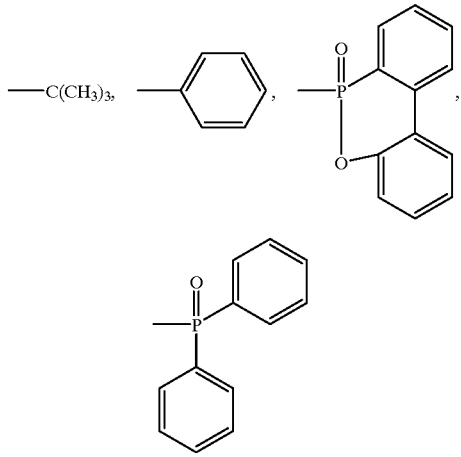

The polycarbonate resin of component (B) of the present invention is produced by hot-melt polymerization of an aromatic dihydroxy compound and a diester carbonate, and the equivalence ratio of phenolic end group (I) and nonphenolic end group (II) (I)/(II) is greater than 1/19, greater than 1/10 is further desirable, and greater than 1/5 is especially desirable. When said ratio is less than 1/19, it is not possible to improve the solubility with the thermotropic liquid crystal polyester and delamination occurs, and the mechanical strength becomes poor; therefore, it is not desirable.

Furthermore, it is desirable when the above-mentioned phenolic end group (I) is represented by the formula shown below:

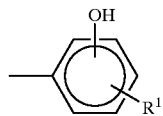

and the nonphenolic end group (II) is represented by the formula shown below:

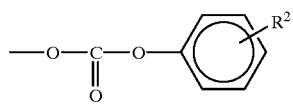

In both of the above-mentioned formulas, $R^1$ and $R^2$ each represent a hydrogen atom, a linear or branched, substituted or unsubstituted, alkyl group with less than 20 carbons that may be substituted with halogen atoms, preferably, fluorine, chlorine, or bromine.

The adjustment of the equivalence ratio of the above-mentioned polycarbonate end groups can be easily performed by changing the molar ratio of the aromatic dihydroxy compound and diester carbonate raw materials at the time of manufacturing the polycarbonate by means of hot-melt polymerization.

For example, when bisphenol A is used for the aromatic dihydroxy compound, and diphenylcarbonate is used as the diester carbonate, the end group of the polycarbonate is a phenolic residue based on the bisphenol A and the phenyl group based on diphenylcarbonate, and when the molar ratio of the bisphenol A is increased, the equivalence ratio of the phenolic end group (I) and nonphenolic end group (II), (I)/(II) of the polycarbonate produced increases.

Furthermore, the polycarbonate of the present invention may be a branched type. The branched polycarbonate can be produced by the reaction of a polyfunctional aromatic compound with a diphenol and/or carbonate precursor as a branched thermoplastic resin random branched carbonate.

In a polycarbonate used for standard application, especially, a polycarbonate produced by the reaction (especially, by interfacial polymerization method) of an aromatic dihydroxy compound such as bisphenol A and carbonyl chloride, the equivalence ratio of phenolic end group (I) and nonphenolic end group (II), (I)/(II) is less than 1/19, and it is not desirable.

The method used for manufacturing the polycarbonate of the present invention itself is a known method in which a polycarbonate is synthesized by a transesterification reaction of the aromatic dihydroxy compound and a diester carbonate under hot-melt conditions.

The aromatic dihydroxy compound used is not especially limited, and many known materials can be used. For example, compounds shown in the formula below:

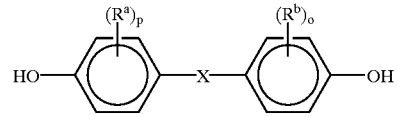

(In this case, $R^a$ and $R^b$ each represent a halogen or univalent hydrocarbon group, X represents $-C(R^c)(R^d)-$, $-C(=R^e)-$, $-O-$, $-S-$, $-SO-$, or $-SO_2-$, $R^c$ and $R^d$ each represent an atomic hydrogen or univalent hydrocarbon group, and $R^e$ represents a divalent hydrocarbon group, p and q each represent an integer in the range of 0–4.) for example, bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butyl phenyl)propane, and 2,2-bis(4-hydroxy-3-bromophenylpropane, bis(hydroxyaryl)cycloalkanes such as 1,1-bis(4-hydroxyphenyl)cyclopentane, and 1,1-(4-hydroxyphenyl)cyclohexane, dihydroxyaryl ethers such as 4,4'-dihydroxydiphenyl ether, and 4,4'-dihydroxy-3,3'-dimethylphenyl ether, dihydroxydiaryl sulfides such as 4,4'-dihydroxydiphenyl sulfide, and 4,4'-dihydroxy-3,3'-dimethylphenyl sulfide, dihydroxydiaryl sulfoxides such as 4,4'-dihydroxydiphenyl sulfoxide, 4,4'-dihydroxy-3,3'-dimethyldiphenyl sulfoxide, and dihydroxydiaryl sulfones such as 4,4'-dihydroxydiphenyl sulfone, 4,4'-dihydroxy-3,3'-dimethyldiphenyl sulfone, etc., can be mentioned, but it is not limited to these compounds. Among those described above, 2,2-bis(4-hydroxyphenyl)propane is especially desirable. In addition to the above-mentioned compounds, compounds shown in the general formula below:

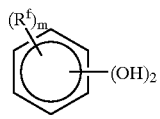

(In this case, $R^f$ represents a hydrocarbon group with 1–10 carbons, or halogen compound or halogen atom thereof, and m is an integer in the range of 0–4.) for example, resorcinal, and substituted resorcinols such as 3-methyl resorcinol, 3-ethyl resorcinol, 3-propyl resorcinol, 3-butyl resorcinol, 3-t-butyl resorcinol, 3-phenyl resorcinol, 3-cumyl resorcinol, 2,3,4,6-tetrafluororesorcinol, and 2,3,4,6-tetrabromo resorcinol, catechol, hydroquinone and substituted hydroquinones such as 3-methylhydroquinone 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, in addition, 2,2,2',2'-tetrahydro-3,3,3',3'-tetramethyl-1,1'-spiro-b-[1H-indene]-7,7'-diol shown in the formula below:

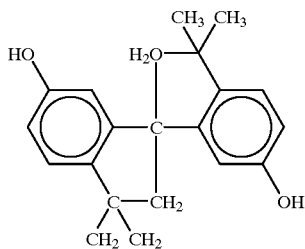

etc., can be used as aromatic dihydroxy compounds.

The above-mentioned dihydroxy compounds may be used independently, or in combination of two or more compounds.

Also, diester carbonates are not especially limited, for example, diphenyl carbonate, ditolyl carbonate, bis(chlorophenyl)carbonate, m-cresyl carbonate, dinaphthyl carbonate, bis(diphenyl)carbonate, diethyl carbonate, dimethyl carbonate, dibutyl carbonate, dicyclohexyl carbonate, etc., can be mentioned, but it is not limited to these compounds. In particular, diphenyl carbonate is further desirable.

The above-mentioned diester carbonates may be used independently, or in combination of two or more compounds.

The above-mentioned diester carbonates may include dicarboxylic acids or dicarboxylic acid esters. For examples of dicarboxylic acids and dicarboxylic acid esters, aromatic dicarboxylic acids such as terephthalic acid isophthalic acid, diphenylterephthalate, and diphenylisophthalate, aliphatic dicarboxylic acids such as succinic acid, glutaric acid, adipic acid, pimelic acid, suberic acid, azelaic acid, sebacic acid, decanedioic acid, dodecaredioic acid, diphenyl sebacate, diphenyldecanedioic acid, diphenyldodecanedioic acid, alicyclic dicarboxylic acids such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenylcyclopropanedicarboxylate, 1,2-cyclobutanediphenyldicarboxylate, 1,3-cyclobutanediphenyldicarboxylate, 1,2-cyclopentanediphenyldicarboxylate, 1,3-cyclopentanediphenyldicarboxylate, 1,2-cyclohexanediphenyldicarboxylate, 1,3-cyclohexanediphenyldicarboxylate, and 1,4-cyclohexanediphenyldicarboxylate, can be mentioned.

The above-mentioned dicarboxylic acids and dicarboxylic acid esters may be used independently, or as a combination of two or more compounds. The amount of the dicarboxylic acid or dicarboxylic acid ester included is preferably less than 50 mol % for the above-mentioned diester carbonates, and an amount of less than 30 mol % is further desirable.

In addition to an aromatic dihydroxy compound and diester carbonate, polyfunctional compounds containing at least three functional groups in a single molecule can be further included in manufacturing the polycarbonate. For said polyfunctionial compounds, compounds containing a phenolic hydroxy group or carboxyl group, and a compound containing three phenolic hydroxy groups is especially desirable.

For examples of desirable compounds, 1,1,1-tris(4-hydroxyphenyl)ethane, 2,2'2"-tris(4-hydroxyphenyl)diisopropylbenzene, α-methyl-α,α',α'-tris(4-hydroxyphenyl)-1,4-diethylbenzene, α,α',α"-tris(4-hydroxyphenyl)-1,3,5-triisopropylbenzene, fluoroglycin, 4,6-dimethyl-2,4,6-tri(4-hydroxyphenyl)-heptane-2,1,3,5-tri(4-hydroxyphenyl)benzene, 2,2-bis(4,4-(4,4'-dihydroxyphenylcyclohexyl)propane, trimellitic acid, 1,3,5-benzene tricarboxylic acid, pyromellitic acid, etc., can be mentioned.

Among those described above, 1,1,1-tris(4-hydroxyphenyl)ethane, α,α',α"-tris(4-hydroxyphenyl)-1,3,5-triisopropylbenzene, etc., are further desirable. The amount of the polyfunctional compound used is preferably less than 0.03 mol for 1 mol of aromatic dihydroxy compound, and less than 0.001–0.02 mol is further desirable, and less than 0.001–0.01 mol is especially desirable.

Also, a compound capable of introducing at least one end group shown in the formula below:

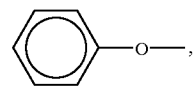

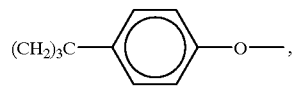

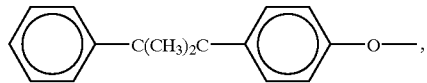

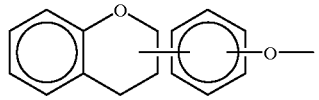

(In this case, the aromatic ring or chromanyl group may be substituted with a halogen or an alkyl group with 1–9 carbons.) to the polycarbonate produced may be further included. For the compound capable of introducing the hydroxy group shown in the formula (1), diol compounds such as bisphenol A can be mentioned. For the compound capable of introducing the phenoxy group shown in the formula (2), phenol, diphenyl carbonate, etc., can be mentioned; for the compound capable of introducing the p-t-butylphenoxy group shown in the formula (3), p-t-butyl phenol, p-t-butylphenylcarbonate, p-t-butylphenylcarbonate, etc., can be mentioned, and for the compound capable of introducing the p-cumylphenoxy group (p-phenylisopropylphenoxy group) shown in the formula (4), p-cumylphenol, p-cumylphenylphenyl carbonate, p-cumylphenyl carbonate, etc., can be mentioned. For the chromanylphenoxy group shown in the above-mentioned formula (5), chromanylphenoxy groups such as those shown in the formula below can be mentioned:

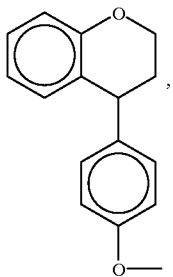 (5-1)

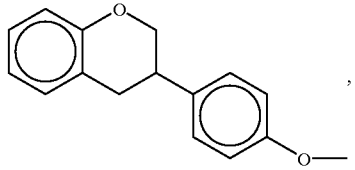 (5-2)

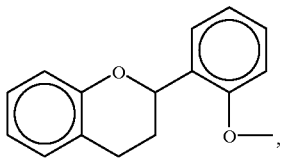 (5-3)

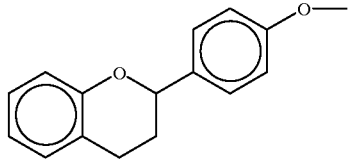 (5-4)

For the compound capable of introducing the group shown in (5-1), 2,2,4-trimethyl-4-(4-hydroxyphenyl)chroman, 2,2,4,6-tetramethyl-4-(3,5-dimethyl-4-hydroxyphenyl) chroman, 2,3,4-trimethyl-2-ethyl-4-(3-nonyl-4-hydroxyphenyl)-7-nonylchroman, 2,2,4-trimethyl-4-(3,5-diethyl-4-hydroxyphenyl)-6-ethylchroman, 2,2,4,6,8-pentamethyl-4-(3,5-dimethyl-4-hydroxyphenyl)chroman, 2,2,4-triethyl-3-methyl-4-(4-hydroxyphenyl)chroman, 2,2,4-trimethyl-4-(3-bromo-4-hydroxyphenyl)-6-bromochroman, 2,2,4-trimethyl-4-(3-bromo-4-hydroxyphenyl)-6-bromochroman, 2,2,4-trimethyl-4-(3,5-dibromo-4-hydroxyphenyl)-6-bromochroman, 2,2,4-trimethyl-4-(3,5-dibromo-4-hydroxyphenyl)-6,8-dibromochroman, etc., can be mentioned, and among those listed above, 2,2,4-trimethyl-4-(4-hydroxyphenyl)chroman is further desirable; for the compound capable of introducing groups shown in (5-2), 2,2,3-trimethyl-3-(4-hydroxyphenyl)chroman, 2,2,3,6-tetramethyl-3-(3,5-dimethyl-4-hydroxyphenyl)chroman, 2,3,4-trimethyl-2-ethyl-3-(3-nonyl-4-hydroxyphenyl)-7-nonylchroman, 2,2,3-trimethyl-3-(3,5-diethyl-4-hydroxyphenyl)-6-ethylchroman, 2,2,3,6,8-pentamethyl-3-(3,5-dimethyl-4-hydroxyphenyl)chroman, 2,2,3-triethyl-3-methyl-3-(4-hydroxyphenyl)chroman, 2,2,3-trimethyl-3-(3-bromo-4-hydroxyphenyl)-6-bromochroman, 2,2,3-trimethyl-3-(3,5-dibromo-4-hydroxyphenyl)-6-bromochroman, 2,2,3-trimethyl-3-(3,5-dibromo-4-hydroxyphenyl)-6,8-dibromochroman, etc. can be mentioned, and among those listed above, 2,2,3-trimethyl-3-(4-hydroxyphenyl)chroman is further desirable, for the compound capable of introducing the group shown in (5-3), 2,4,4-trimethyl-2-(2-hydroxyphenyl)chroman, 2,4,4,6-tetramethyl-2-(3,5-dimethyl-2-hydroxyphenyl)chroman, 2,3,4-trimethyl-4-ethyl-2-(3,5-dimethyl-2-hydroxyphenyl)-7-nonyl-chroman, 2,4,4-trinethyl-2-(3,5-dimethyl-2-hydroxyphenyl)-6-ethylchroman, 2,4,4,6,8-pentamethyl-2-(3,5-dimethyl-2-hydroxyphenyl)-6-ethylchroman, 2,4,4-trimethyl-2-(3-bromo-2-hydroxyphenyl)chroman, 2,4,4-trimethyl-2-(3-bromo-2-hydroxyphenyl)-6-bromochroman, 2,4,4-trimethyl-2-(3,5-dibromo-2-hydroxyphenyl)-6-bromochroman, 2,4,4-trimethyl-2-(3,5-dibromo-2-hydroxyphenyl)-6,8-dibromochroman, etc., can be mentioned, and among those listed above, 2,4,4-trimethyl-2,2-(hydroxyphenyl)chroman is further desirable, for the compound capable of introducing the group shown in (5-4), 2,4,4-trirnethyl-2-(4-hydroxyphenyl)chroman, 2,4,4,6-tetramethyl-2-(3,5-dimethyl-4-hydroxyphenyl)chroman, 2,4,4-triethyl-2-(4-hydroxyphenyl)chroman, 2,3,4-trimethyl-4-ethyl-2-(3,5-dimethyl-4-hydroxyphenyl)-7-nonylchroman, 2,4,4-trimethyl-2-(3,5-dimethyl-4-hydroxyphenyl)-6-ethylchroman, 2,4,4,6,8-pentamethyl-2-(3,5-dimethyl-4-hydroxyphenyl)-6-ethylchroman, 2,4,4-trimethyl-2-(3-bromo-4-hydroxyphenyl)chroman, 2,4,4-trimethyl-2-(3-bromo-4-hydroxyphenyl)-6-bromochroman, 2,4,4-trimethyl-2-(3,5-dibromo-4-hydroxyphenyl)-6-bromochroman, 2,4,4-trimethyl-2-(3,5-dibromo-4-hydroxyphenyl)-6,8-dibromochroman, etc., can be mentioned, and among those listed above, 2,4,4-trimethyl-2-(4-hydroxyphenyl)chroman is especially desirable.

The above-mentioned aromatic ring or aliphatic ring may be further substituted with a halogen or an alkyl group with 1–9 carbons. The above-mentioned compounds may be used independently, or as a combination of two or more compounds.

The amount of the above-mentioned compounds used is 1.00–1.30 mol for 1 mol of aromatic dihydroxy compound, and 1.01–1.20 diester carbonate is used and a reaction is performed for the two in the presence of a catalyst.

For the catalyst, for example, compounds being suggested in the specification of Japanese Kokai Patent Application No. Hei 4[1992]-175368 by the present inventors can be used. For example, it is desirable to use (a) organic acid salts, inorganic acid salts, oxides, hydroxides, hydrides, alcoholates of metals such as alkali metals and alkaline-earth metals. For specific examples of the above-mentioned compounds, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, borosodium hydroxide, borolithium hydroxide, borosodium phenylide, sodium benzoate, potassium benzoate, lithium benzoate, disodium hydrogenphosphate, dipotassium hydrogenphosphate, dilithium hydrogenphosphate, disodium salt, dipotassium salt, and dilithium salt of bisphenol A, sodium salt, potassium salt, and lithium salt of phenol, potassium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, strontium stearate, etc. can be mentioned, but it is not limited to these compounds. The above-mentioned compounds may be used independently, or as a combination of two or more compounds. The amount of the above-mentioned alkali metal compounds and/or alkaline-earth metal compounds included is preferably $10^{-8}$ to $10^{-3}$ mol for 1 mol of the aromatic dihydroxy compound, $10^{-7}$ to $10^{-6}$ mol is further desirable, and $10^{-7}$ to $8 \times 10^{-7}$ mol is especially desirable.

Furthermore, in addition to above-mentioned alkali metal compounds and/or alkaline-earth metal compounds, (b) basic compounds may be used as a catalyst. For examples of basic compounds, for example, nitrogen compounds, in specific terms, ammonium hydroxides containing alkyl, aryl, alkaryl groups such as tetramethylammonium hydroxide, tetraethylammonium hydroxide, tetrabutylammonium hydroxide, and trimethylbenzylammonium hydroxide, tertiary amines such as trimethylenamine, triethylamine, dimethylbenzylamine, and triphenylamine, secondary or primary amines containing alkyl groups such as methyl group and ethyl group, aryl groups such as phenyl group, and toluyl group, ammonia, and basic salts such as tetramethylammonium borohydride, tetrabutylammonium borohydride, and tetramethylammonium borohydride, etc., can be mentioned, but it is not limited to these compounds. Among those listed above, ammonium hydroxides are especially desirable. The above-mentioned compounds may be used independently, or in combination of two or more compounds.

In the component (B) of the present invention, a polycarbonate with a high molecular weight can be produced at a high polymerization activity level when a combination consisting of the above-mentioned (a) an alkali metal compound and/or alkalineearth metal compound, and (b) a nitrogen-containing basic compound is used as a catalyst.

Furthermore, a combination consisting of (a) an alkali metal compound and/or alkaline metal compound, (b) a nitrogen-containing basic compound, and (c) at least one selected from boric acid or boric acid ester as a catalyst. When a catalyst comprised of the above-mentioned combinations is used, it is desirable to use (a) an alkali metal compound and/or alkaline-earth metal compound in the amount described above, and $10^{-6}$ to $10^{-1}$ mol, preferably $10^{-5}$ to $10^{-2}$ mol, of (b) a nitrogen-containing basic compound for 1 mol of aromatic dihydroxy compound. For boric acid or boric acid ester (c), the compounds shown in the general formula shown below:

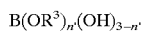

$$B(OR^3)_{n'}(OH)_{3-n'}.$$

(In this case, $R^3$ represents a hydrogen atom, an aliphatic hydrocarbon group, alicyclic hydrocarbon group, or aromatic hydrocarbon group, and n' is an integer in the range of 1–3.) are desirable, and for examples, boric acid, trimethylborate, triethylborate, tributylborate, trihexylborate, triheptylborate, triphenylborate, tritolylborate, trinaphthylborate, etc., can be mentioned. Among those listed above, triphenylborate is further desirable. When the above-mentioned boric acid or boric acid esters (c) are used as catalysts along with the above-mentioned compounds (a) and (b), the amount included is in the range of $10^{-6}$ to $10^{-1}$ mol for 1 mol of aromatic dihydroxy compound, and $10^{-5}$ to $10^{-2}$ mol is especially desirable.

The conditions such as temperature and pressure, etc. used for the hot-melt polymerization reaction are not especially limited, and conditions commonly used for this purpose can be used as well. Specifically, the first stage reaction is carried out at a temperature of 80–250° C., preferably 100–230° C., and especially 120–190° C., for 0–5 h, preferably 0–4 h, and especially 0.25–3 h, at ambient pressure. Subsequently, the reaction temperature is slowly increased while the pressure of the reaction system is being reduced, and a reaction is performed for the aromatic dihydroxy compound and diester carbonate; it is desirable to carry out the final reaction for the aromatic dihydroxy compound and diester carbonate under a pressure of 0.05–5 mm Hg at a temperature of 240–320° C.

The above-mentioned reaction of the aromatic dihydroxy compound and diester carbonate may be carried out by the continuous method or the batch method. The reactor used to perform the above-mentioned reaction may be a tank, a tube, or tower reactor.

For the mixing ratio of the polycarbonate in the flame retardant polycarbonate resin composition of the present invention, 90–40 parts by weight, as indicated above, is desirable as a range capable of achieving the objective. Furthermore, manufacturing of the final product of the resin compositions of the present invention can be achieved by standard fabrication methods such as injection molding, extrusion molding, blow molding, and compression molding.

Furthermore, in addition to the additives described above, known additives, for example, reinforcing materials such as glass fibers, carbon fibers, and metal whiskers, fillers such as carbon blacks, calcium carbonate, and glass beads, lubricants such as paraffin waxes, and silicone oils, antioxidants such as hindered phenols, weather-resistant agents such as epoxy type monomers, and triazine, etc., can be further included in the fire-resistant polycarbonate resin composition of the present invention.

Furthermore, polymers such as polycarbonates, polybutylene terephthalates, polyethylene terephthalates, polyethylenes, and polyethylenepropylene copolymers other than those mentioned above may be used in combination.

For the flame-retardant component (C) used in the fire-resistant polycarbonate resin composition of the present invention, 2–20 parts by weight of a phosphate flame retardant, halogen flame retardant, or a brominated compound flame retardant can be used. When the amount used is less than 2 parts by weight, the improvement in the flame-retardant properties is inadequate, and when greater than 20 parts by weight is used, properties of the composition may be lost.

For the phosphate flame retardants, phosphate compounds shown in the formula below:

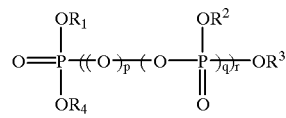

(In this case, $R^1$, $R^2$, $R^3$, and $R^4$ each represents a hydrogen atom, or an organic group, but excludes the case of $R^1=R^2=R^3=R^4=H$. X' represents an organic group greater than divalent, p is either 0 or 1, q is an integer greater than 1, for example, 30, and r is an integer above 0.) can be mentioned. But it is not limited to said compounds.

In the above-mentioned formula (Structure 10), "organic group" means alkyl groups, cycloalkyl groups, and aryl groups that may not be substituted. When the group is substituted, for example, alkl groups, alkoxy groups, alkylthio groups, halogens, aryl groups, aryloxy groups, arylthio groups, halogenated aryl groups, etc., can be mentioned for substituents; furthermore, combinations of the above substituents (for example, arylalkoxyalkyl group, etc.), the above-mentioned substituents bonded with an oxygen atom, a sulfur atom, or nitrogen atom, etc. (for example, arylsulfonylaryl group, etc.) can be used as substituents. "Organic groups greater than divalent" means groups greater than divalent produced by removing at least one of the hydrogen atoms bonded to carbon atoms in the above-mentioned organic groups. For example, those derived from alkylene groups, and preferably, (substituted) phenylene groups, polynuclear phenols, for example, bisphenols, can be mentioned, and the relative locations of the free valence greater than 2 is not limited. In particular, hydroquinone, resorcinol, diphenylolmethane, diphenyloldimethylmethane, dihydroxydiphenyl, p,p'-dihydroxydiphenyl sulfone, dihydroxynaphthalene can be mentioned as suitable groups.

For specific examples of phosphate compounds, trimethyl phosphate, triethyl phosphate, tributyl phosphate, trioctyl phosphate, tributoxyethyl phosphate, triphenyl phosphate, tricresyl phosphate, cresylphenyl phosphate, octyldiphenyl phosphate, diisopropylphenyl phosphate, tris(chloroethyl) phosphate, tris(dichloropropyl)phosphate, tris(chloropropyl) phosphate, bis(2,3-dibromopropyl)-2,3-dichloropropylphosphate, tris(2,3-dibromopropyl) phosphate, bis(chloropropyl)monooctyl phosphate, bisphenol A bisphosphate, hydroxybisphosphate, resorcinol bisphosphate, trioxybenzene triphosphate, in which $R^1$–$R^4$ is represented by an alkoxy, for example, methoxy, ethoxy, or propoxy, or (substituted) phenoxy, for example, phenoxy, methyl (substituted) phenoxy, and triphenyl phosphate, can be mentioned, and different kinds of bisphosphates are further desirable.

For halogen flame retardants, brominated epoxies or brominated polycarbonates are suitable.

Furthermore, polytetrafluoroethylene (referred to as to as PTFE hereinafter) of the component (D) in the present invention is a typical polymer that belongs to fluoro resins produced by performing a polymerization for tetrafluoroethylene. The chemical resistance of said polymer is high, and long-term application at a temperature of about 260° C. is possible, and friction is low. When said polytetrafluoroethylene is used in the above-mentioned mixing ratio of 0.1–1.0 part by weight, synergistic effect with the above-mentioned flame retardant is achieved, and the objective can be achieved. When the mixing ratio is less than 0.1 part by weight, the effect is insignificant. On the other hand, when greater than 1.0 part by weight, properties of the composition may deteriorate.

In the following, the present invention is further disclosed with application examples. It should be noted that "parts" in application examples represents parts by weight.

Materials used for production of the thermoplastic resin composition of the present invention are those described below.

For the liquid crystal polymer LCP (1), RODRUM LC5000 (trademark, product of Unitika (Ltd.)) liquid crystal polymer was used.

For LCP (2), VECTRA A950 (trademark, product of Polyplastic (Ltd.)) liquid crystal polymer was used.

For polycarbonate PC (60), LX polycarbonate which has 60% phenolic end groups (product name; product of Nippon G.E. Plastics (Ltd.)) was used.

For the phosphate flame retardant used as FR (1) phenyl resorcinol polyphosphate CR733 (trademark: Daihachi Chemical Co., Ltd.) was used.

Furthermore, for brominated compound flame retardant, a brominated epoxy, Platherm EP-16 (trademark: product of Dainippon Ink Chemical Ind. (Ltd.)) was used for FR (2), and a brominated polycarbonate (Br=25 wt %: product of GE Plastics (USA)) was used as FR (3).

For the first polytetrafluoroethylene PTFE (1), Teflon 30J (trademark: product of Mitsui Du Pont Fluorochemicals (Ltd.) was used. For the second PTFE (2), 20 wt % of PTFE mixed with polycarbonate (product of GE Plastics (USA)) was used. However, the present invention is not limited by these material used.

Each of the above-mentioned materials was used, and extrusion was performed from the biaxial extruder of Toshiba Machines (Ltd.) under the extrusion conditions of the screw rotation of 200 rpm, and a barrel temperature of 270–280° C., and [the extruded material] was cut to a prescribed length to produce a pellet.

The above-mentioned pellet produced was used, and a sample piece for a flame-retardance test was produced by the 80-t injection molder of Toyo Machines and Metals (Ltd.). The molding conditions were set at a barrel temperature of 260° C. and a die temperature of 50° C.

The flame-retardant test was performed by the method specified in UL 94/V0, VI, and VII.

The test was performed for five test pieces according to the test method specified in Bulletin 94 of Underwriters Laboratory Incorporated, "Flame Retardance Test for Material Classification" (referred to as to as UL-94, hereinafter) at a thickness; of 1/16 inch (16 mm) or 1/32 inch (0.8 mm). Based on the test method, the sample materials were evaluated for UL-94, V-0, V-1, and V-II based on the results of the five samples. Each of the UL-94 V standards is briefly explained below.

V-0: The average flame retention time after removal of the burning flame is less than 5 sec, and none of the samples drop burning material that ignites the cotton.

V-I: The average flame retention time after removal of the burning flame is less than 25 sec, and none of the samples drop burning material that ignites the cotton.

V-II: The average flame retention time after removal of the burning flame is less than 25 sec, and samples drop burning material that ignites the cotton.

HB: horizontal burn (samples are not self-extinguishing under UL-94 conditions).

Furthermore, the tensile test was performed by the standard method specified in ASTM method. The ratio of the components used, and the test results are as shown in Tables I–IV.

In Table I, the phosphate flame retardant FR (1) was used as the flame retardant. PTFE (2), and polycarbonate were mixed in the ratios shown below; as a result, compositions with high flame retardance, high tensile elongation properties, and superior flow properties were produced.

TABLE I

|  |  | Comparative Example | Application Example | Application Example |
|---|---|---|---|---|
| Component ratio | PC (60) | 90 | 86 | 84 |
|  | LCP (1) | 10 | 10 | 10 |
|  | Flame retardant FR (1) |  | 4 | 6 |
|  | PTFE (2) | 1.0 | 1.0 | 1.0 |
| Properties | UL 94, 1.6 mm | HB | VI | V0 |
|  | UL 94, 0.8 mm | HB | VII | V0 |
|  | FM, 1.6 mm | 40150 | 41300 | 41500 |
|  | MI, 1.2 kg, 300° C. | 15.1 | 17.2 | 19.3 |

In Table II, the brorninated epoxy flame retardant FR (2) was used as the flame retardant, PTFE (2), and polycarbonate were mixed at the ratios as shown below; as a result, compositions with a very high flame retardance, high tensile elongation properties, and relatively high flow properties were produced.

TABLE II

|  |  | Comparative Example 2 | Application Examples | Application Examples |
|---|---|---|---|---|
| Component ratio | PC (60) | 90 | 86 | 84 |
|  | LCP (1) | 10 | 10 | 10 |
|  | Flame retardant FR (2) |  | 4 | 6 |
|  | PTFE (2) | 1.0 | 1.0 | 1.0 |
| Properties | UL 94, 1.6 mm | HB | V0 | V0 |
|  | UL 94, 0.8 mm | HB | VII | VI |
|  | FM, 1.6 mm | 40150 | 40230 | 40210 |
|  | MI, 1.2 kg, 300° C. | 15.1 | 14.9 | 14.8 |

In Table III, the brominated polycarbonate flame retardant FR (3) was used as the flame retardant, PTFE (1), and polycarbonate were mixed at the ratios as shown below; as a result, compositions with high flame retardance, high tensile elongation properties, and superior flow properties as well as superior HDT were produced.

TABLE III

|  |  | Comparative Example 3 | Application Example 5 | Application Example 6 | Application Example 7 |
|---|---|---|---|---|---|
| Component ratio | PC (60) | 90 | 86 | 84 | 81 |
|  | LCP (1) | 10 | 10 | 10 | 10 |
|  | Flame retardant FR (3) |  | 4 | 6 | 9 |
|  | PTFE (1) | 0.5 | 0.5 | 0.5 | 0.5 |
| Properties | UL 94, 1.6 mm | HB | VI | V0 | V0 |
|  | UL 94, 0.8 mm | HB | VII | VI | V0 |
|  | FM, 1.6 mm | 40150 | 40170 | 40230 | 40180 |
|  | HDT, 18.6 kg/cm$^2$ | 141 | 141 | 141 | 141 |

In Table IV, for the phosphate flame retardant FR (1) used as the flame retardant, PTFE (1), and polycarbonate mixed at the ratios as shown below, LCP (2) with a different structure than that of the liquid crystal polymer LCP (1) was mixed at the ratio shown below; as a result, compositions with high flame retardance, high tensile elongation properties, and superior HDT were produced.

TABLE IV

|  |  | Comparative Example 4 | Application Example 8 | Application Example 9 |
|---|---|---|---|---|
| Component ratio | PC (60) | 90 | 86 | 84 |
|  | LCP (2) | 10 | 10 | 10 |
|  | Flame retardant FR (1) |  | 4 | 6 |
|  | PTFE (2) | 1.0 | 1.0 | 1.0 |
| Properties | UL 94, 1.6 mm | HB | VI | V0 |
|  | UL 94, 0.8 mm | HB | VII | V0 |
|  | FM, 1.6 mm | 37860 | 38230 | 39650 |
|  | MI, 1.2 kg, 300° C. | 15.6 | 17.3 | 19.5 |

Compared with conventional products, the properties of the mold produced from the fire-resistant polycarbonate resin composition of the present invention show higher flame retardance, impact resistance, and high tensile strength as well. As is shown in the preceding Tables I–IV, the flexural modulus for each Application Example containing a flame retardant is a least equal to the flexural modulus of the corresponding comparative Example. Addition of a flame retardant to the Application Examples furthermore results in the Example meeting a UL-94 flame-retardant standard of at least V-II at a thickness of $^{1}/_{16}$th inch. Because of the above-mentioned superior properties, in particular, high rigidity, the product can be phones, and PHP (personal handiphones).

We claim:

1. A fire-resistant thin wall housing comprising a homogeneous polycarbonate resin comprising A) 5–50 parts by weight of a liquid crystal polymer, B) 90–40 parts by weight of a polycarbonate resin, produced by hot-melt polymerization of an aromatic dihydroxy compound and a diester carbonate, having phenolic and nonphenolic end groups and having an equivalence ratio of phenolic end group (I) and non-phenolic end group (II), (I)/(II), which is greater than $^{1}/_{19}$, C) 2–20 parts by weight of a flame retardant, and D) 0.1–1.0 part by weight of polytetrafluoroethylene wherein the housing meets a UL-94 flame-retardant standard of at least V-II at a thickness of $^{1}/_{16}$ inch and has a flexural modulus at least equal to the flexural modulus of a thin wall housing of substantially the same thickness which contains no flame retardant.

2. The housing of claim 1 wherein flame retardant C) is a phosphate compound.

3. The housing of claim 1 wherein flame retardant C) is a brominated epoxy.

4. The housing of claim 1 wherein flame retardant C) is a brominated polycarbonate.

5. The housing of claim 1 wherein flame retardant C) is a combination of a phosphate and a brominated epoxy or a brominated polycarbonate.

6. The housing of claim 1 wherein the liquid crystal polymer is a thermotropic liquid crystal polyester.

7. The housing of claim 6 wherein the polyester contains segments with the structure —O—R—O—,
—CO—RCO— or
—O—R—CO— wherein R is selected from

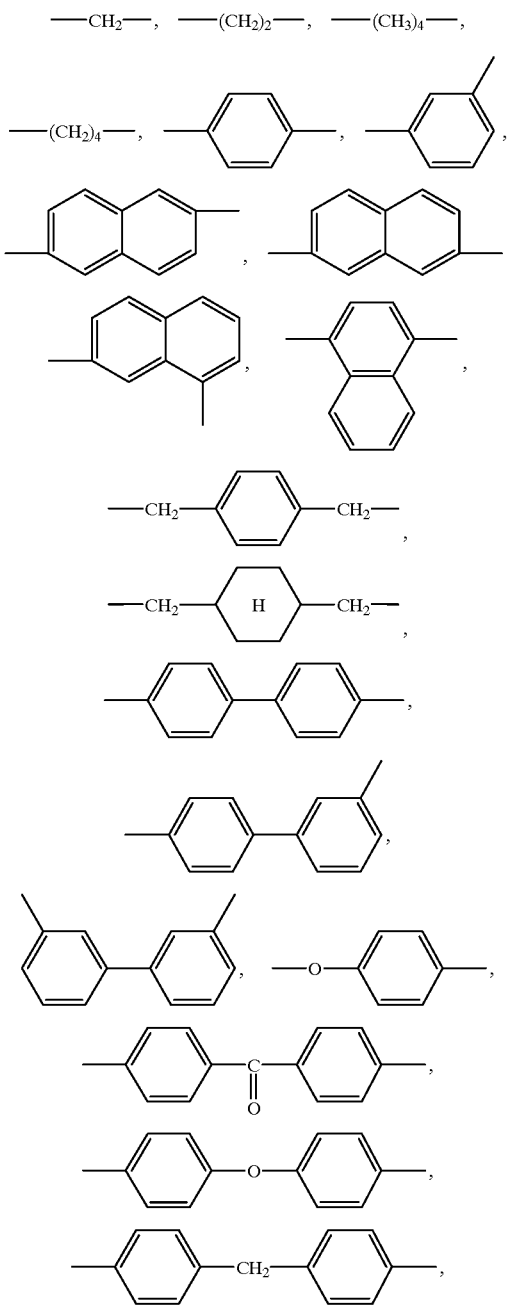

-continued

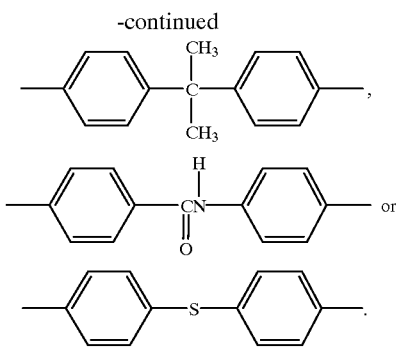

8. The housing of claim 6 wherein the polyester contains segments with the structure —O—R—O—,
—CO—RCO— or
—O—R—CO— wherein R is selected from

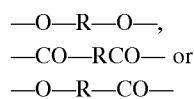

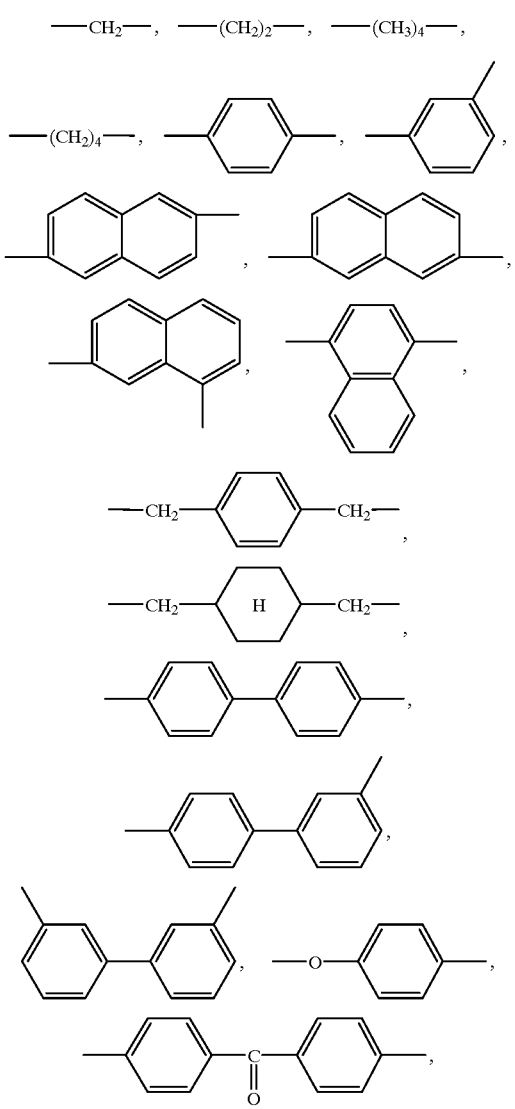

-continued

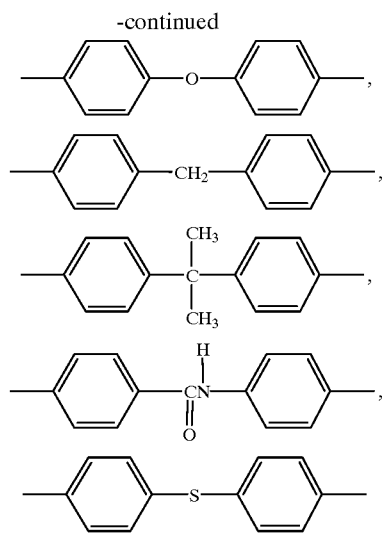

and wherein the aromatic rings, aliphatic groups or alicyclic groups of R are substituted with —BR, —Cl, —COOH, —COHN$_2$, —CH$_3$, —C(CH3)$_3$,

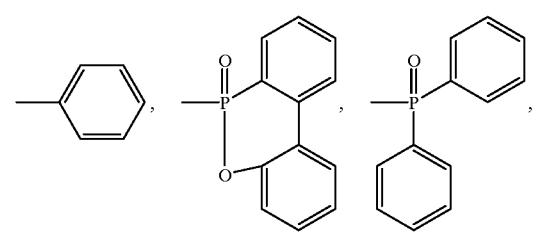

or combinations thereof.

9. The housing of claim 1 wherein the equivalence ratio is greater than 1/10.

10. The housing of claim 9 wherein the equivalence ratio is greater than 1/5.

11. The composition of claim 1 wherein the phenolic end group (I) has the formula

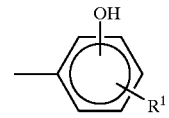

and the nonphenolic end group (II) has the formula

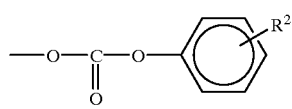

wherein $R^1$ and $R^2$ each represent a hydrogen atom, a linear or branched alkyl group with less than 20 carbons, unsubstituted or substituted with halogen atoms.

12. The housing of claim 1 wherein the polycarbonate resin comprises a branched polycarbonate.

13. The housing of claim 1 wherein the diester carbonate is diphenyl carbonate.

14. The housing of claim 1 wherein the aromatic dihydroxy compound is 2,2-bis(4-hydroxyphenyl)propane.

15. The housing of claim 14 wherein the diester carbonate is a combination of carbonates.

16. The housing of claim 14 wherein the diester carbonate is diphenyl carbonate.

17. The housing of claim 1, in which the flame retardant C) is one, or a combination, of a) phosphate compounds, b) brominated epoxies, or c) brominated polycarbonates.

18. A fire-resistant thin wall housing consisting essentially of a homogeneous polycarbonate resin consisting essentially of A) 5–50 parts by weight of a liquid crystal polymer, B) 90–40 parts by weight of a polycarbonate resin, produced by hot-melt polymerization of an aromatic dihydroxy compound and a diester carbonate, having phenolic and nonphenolic end groups and having an equivalence ratio of phenolic end group (I) and nonphenolic end group (II), (I)/(II), which is greater than $1/19$, C) 2–20 parts by weight of a flame retardant, and D) 0.1–1.0 part by weight of polytetrafluoroethylene wherein the housing meets a UL-94 flame-retardant standard of at least V-II at a thickness of $1/16$ inch and has a flexural modulus at least equal to the flexural modulus of a thin wall housing of substantially the same thickness which contains no flame retardant.

19. The housing of claim 18 which is a computer housing.

20. The housing of claim 18 which is a case for a small portable machine.

* * * * *